Oct. 6, 1959

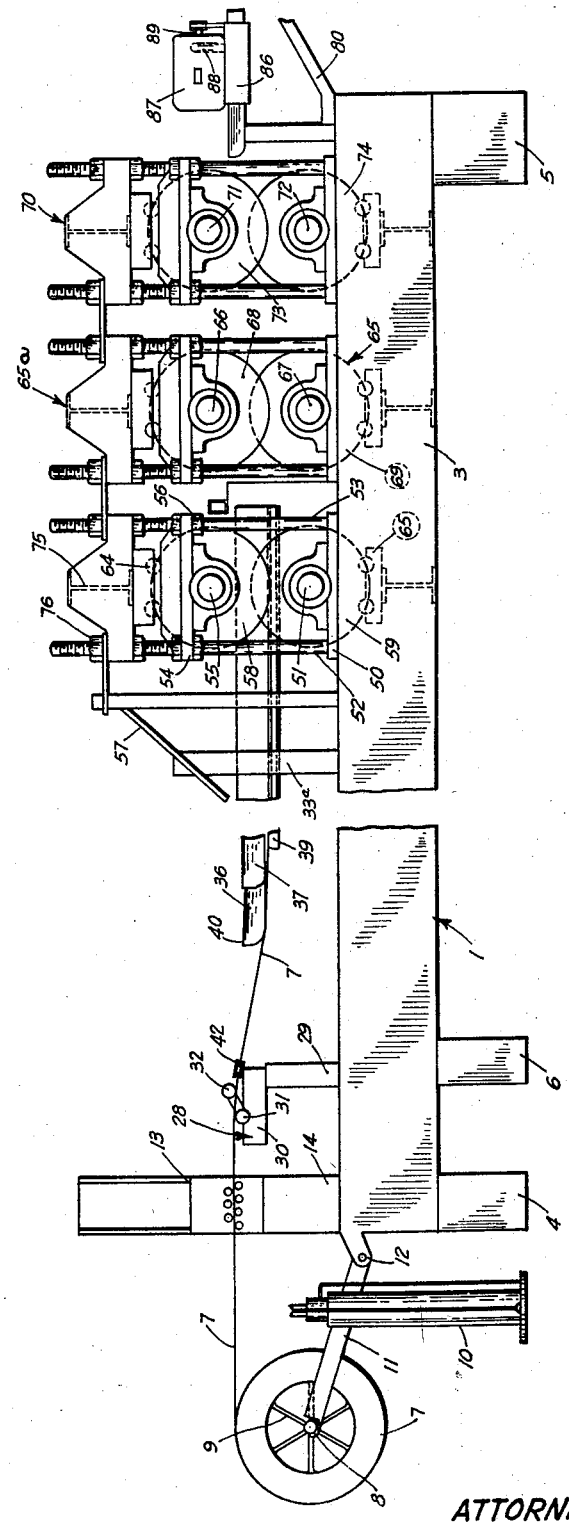

W. BRAUER 2,907,369

APPARATUS FOR FORMING STRESSED PANELS AND HAVING GUIDE
BARS FOR INITIALLY BENDING UNDULATIONS IN SHEET
MATERIAL BEFORE FORMING A CHANNEL FROM
EACH UNDULATION

Filed Sept. 2, 1955

INVENTOR.
Walter Brauer
BY
ATTORNEY C. M. McKnight

Oct. 6, 1959 W. BRAUER 2,907,369
APPARATUS FOR FORMING STRESSED PANELS AND HAVING GUIDE
BARS FOR INITIALLY BENDING UNDULATIONS IN SHEET
MATERIAL BEFORE FORMING A CHANNEL FROM
EACH UNDULATION
Filed Sept. 2, 1955 5 Sheets-Sheet 4

INVENTOR.
Walter Brauer
BY
ATTORNEY

Oct. 6, 1959 W. BRAUER 2,907,369
APPARATUS FOR FORMING STRESSED PANELS AND HAVING GUIDE
BARS FOR INITIALLY BENDING UNDULATIONS IN SHEET
MATERIAL BEFORE FORMING A CHANNEL FROM
EACH UNDULATION
Filed Sept. 2, 1955 5 Sheets-Sheet 5

INVENTOR.
Walter Brauer
BY
C. McKnight
ATTORNEY

United States Patent Office 2,907,369
Patented Oct. 6, 1959

2,907,369

APPARATUS FOR FORMING STRESSED PANELS AND HAVING GUIDE BARS FOR INITIALLY BENDING UNDULATIONS IN SHEET MATERIAL BEFORE FORMING A CHANNEL FROM EACH UNDULATION

Walter Brauer, Corpus Christi, Tex.

Application September 2, 1955, Serial No. 532,194

3 Claims. (Cl. 153—77)

This invention relates to a forming process and apparatus, and more particularly, but not by way of limitation, to a multiple step forming process for forming light weight panels into an undulated pattern of constant pitch capable for use in variable types of construction.

The present invention comprehends a multiple forming means for forming construction panels into an undulated pattern of constant pitch from sheet aluminum, aluminum alloy, laminated plastic, or like material being fed in a horizontal path for initially forming a slight bend or concavity to the traveling sheet with a subsequent progressive forming of a plurality of recesses or undulations transversely of the traveling sheet, and hence forming angular recessed portions of constant pitch having up-set portions at the apex of the recesses to substantially increase the strength and rigidity of the finally formed panel. The forming apparatus applies concentrated pressure subsequent to the initial bending and forming of the undulations in the sheet material, particularly in the forming of the angled recesses, rather than over the entire width of the panel or traveling sheet. The concentrated pressure simultaneously forms the up-set portions running longitudinally in conjunction with the angled recesses to provide the advantageous strength and rigidity in the formed panel.

It is an important object of this invention to provide a method and apparatus of forming continuous grooves or channels in a metal sheet in a manner to afford great rigidity and strength thereto.

And still another object of this invention is to provide an apparatus and method for forming continuous recesses in a traveling sheet material in a progressive forming operation wherein the recesses are provided with an up-set portion extending longitudinally of the apex of each recess.

And still another object of this invention is to provide a method and apparatus for progressively forming a plurality of uniform recesses in a flat sheet having up-set portions provided at the apex of the recesses, and in a manner to eliminate any risk of rupture or tearing of the metal sheet during the forming operation.

And still another object of this invention is to provide an apparatus and method for progressively forming a plurality of longitudinally aligned recesses in a flat sheet effecting substantial strength and rigidity to the over-all sheet in a manner that substantially precludes any stretching or weakening of the metal sheet during the forming operation.

And still another object of this invention is to provide a method and apparatus for forming undulated construction panels from a flat sheet which progressively bends the sheet in multiple operations to effect a construction panel that facilitates an overlapping connection between multiple panels of like material.

And still another object of this invention is to provide a multiple forming machine wherein metal sheets may be fed progressively through the machine and automatically provided with angled recesses disposed transversely to the direction of movement.

And still another object of this invention is to provide a method and apparatus which is durable, simple in operation and has large capacity.

Other objects and advantages of the invention will be evident from the following detailed description, read in conjunction with the accompanying drawings, which illustrate my invention.

In the drawings:

Figure 1 is a broken side elevational view of the forming machine with certain elements omitted for purposes of clarity.

Figure 2:
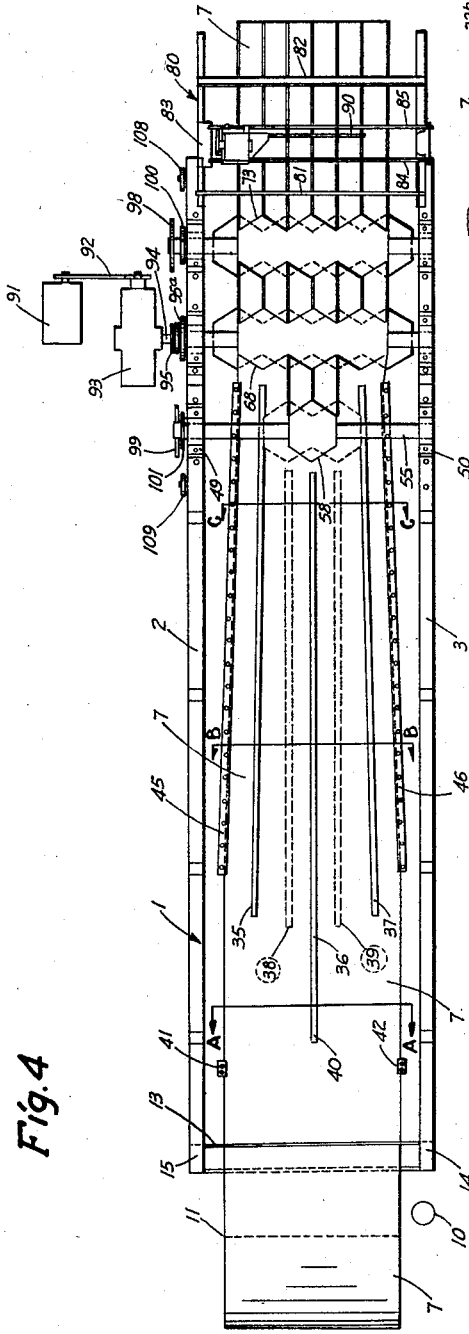
Figure 2 is a top plan view thereof having certain elements omitted for purposes of clarity.

Referring to the drawings in detail, reference character 1 represents in general a frame member for the forming apparatus having the side supporting members 2 and 3, respectively, generally provided by suitable channel or angle irons. The frame 1 is supported at each end by suitable leg members 4 and 5 and intermittently supported by leg members 6. Suitable strengthening ribs (not shown) may be provided throughout the frame member in any well known manner. As is clearly shown in Figs. 1 and 2, a roll or platen 7 of suitable sheet material, such as aluminum alloy, laminated plastic, or the like, but not limited thereto, is disposed at one end of the machine and supported on a shaft 8 having a plurality of circumferentially spaced radially extending spoke members 9 with tubular end portions for supporting the roll of material thereon. The shaft 8 of the roll 7 is supported by a pair of pivotal arms 11 secured at 12 to each side of the frame member 1 (Figs. 1 and 2). The arms are maintained in upright position by a jack or lifting unit 10 of any suitable type, such as shown in Fig. 1. The jack supports the arms 11 for maintaining the coil or roll 7 in raised position for directing the sheet of material from the coil into the machine above the frame 1.

Figure 12:
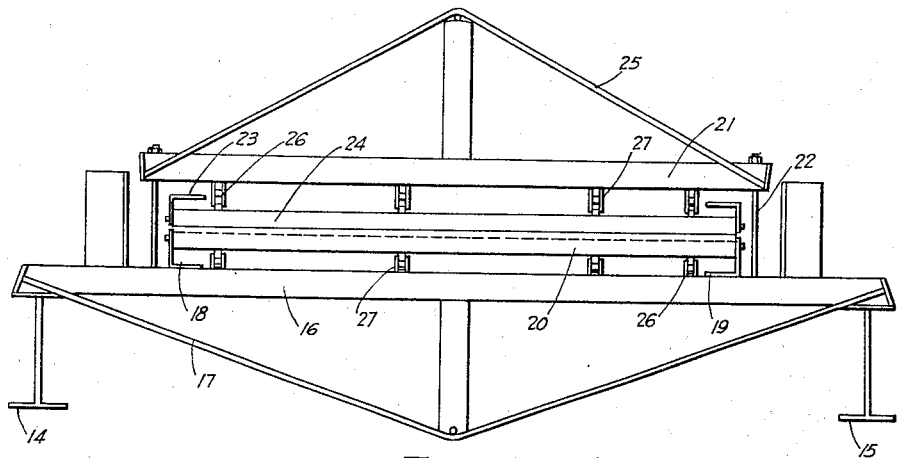
Figure 12 is a front elevational view of the leveler mechanism.
Figure 13:
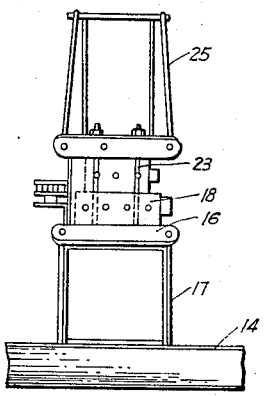
Figure 13 is a side elevational view thereof.
Figure 14:
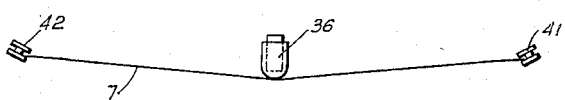
Figure 14 is a sectional view taken on lines A—A of Fig. 2.
Figure 15:
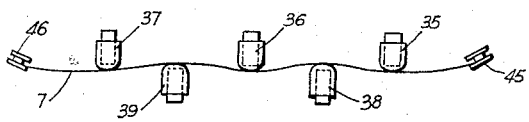
Figure 15 is a similar view taken on lines B—B of Fig. 2.
Figure 16:
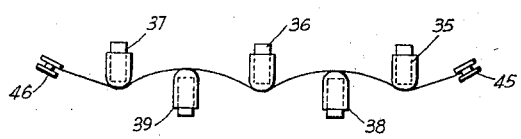
Figure 16 is a similar view taken on lines C—C of Fig. 2.

The material 7 is fed manually from the roll and at the initial step is caused to travel through a leveling unit 13 shown in detail in Fig. 12. The leveling device is supported on the frame member by suitable angle frame members 14 and 15 (Fig. 12) in turn supporting a cross bar 16 re-enforced with bars 17. The cross bar 16 in turn supports a pair of transversely spaced apertured angle irons 18 and 19 for journalling one or more lower leveling rolls 20 therein. An upper cross bar 21 is supported by uprights 22 above the bar 16, and the upper cross bar is provided with apertured angle bars 23 for journalling a plurality of upper leveling rolls 24 in alignment with the lower rolls 20. The cross bar 21 is provided with suitable bracing members 25 as is clearly shown in Figs. 12 and 13. A plurality of sets of adjustable pressure rolls 26 are transversely disposed on one side of the rolls 20 and 24. Each set of pressure rolls provides for several rolls supported in bracket members 27 secured in any suitable manner to the cross bars 16 and 21 respectively.

From the leveling unit 13, the material is fed longitudinally through the machine to a lubricating station indicated generally at 28. The lubricating apparatus 28 as shown generally in Fig. 1 comprises side arms or upright members 29 for supporting a trough member 30 containing any suitable lubricant of light density, such as kerosene or the like, but not limited thereto. A plurality of lower longitudinally spaced rolls 31 which extend transversely of the sheet 7 are disposed in the trough 30 and cooperate with an upper roll 32. It will be apparent that as the sheet passes between the rolls 31 and 32, the lubricant is applied to the entire under surface of the traveling sheet and thereby assures free movement of the sheet through the subsequent guide and roll members and particularly through the felt covered bar guides as will be hereinafter set forth. The upper roll 32 may be impregnated with the lubricant to lubricate the upper surface of the sheet in a similar manner if desired.

Figure 3:
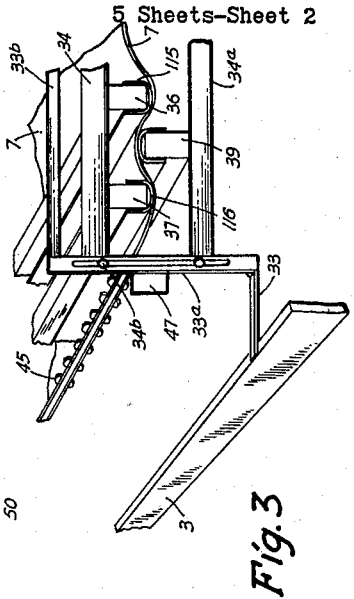
Figure 3 is a detail view in perspective of the guide support means.

The frame supports a plurality of longitudinally disposed guide members (Figs. 1, 2 and 3) adapted to be disposed both above and below the path of the sheet traveling through the frame. The side rails 2 and 3 are provided with a plurality of longitudinally spaced angled aligned support members 33 (Fig. 3) having a vertical slotted upright 33a provided with an upper transverse re-enforcing bar 33b. It will be apparent that the cantilever arranged bars 33 extend inwardly from both rails 2 and 3 in alignment, although only one is shown in Fig. 3. The upright members 33a are slotted to receive an upper cross bar 34 and a lower cross bar 34a maintained therein in adjustable position by suitable bolt members 34b. The bars 34 and 34a extend transversely across the traveling sheet 7 for connection with a similar upright 33a cooperating with the side rail 2 (not shown in Fig. 3). It will be understood that there are a plurality of aligned support members 33 arranged longitudinally along the frame for supporting a plurality of longitudinally disposed guide bars. The upper guide bars 35, 36 and 37 (preferably three in number, but not limited thereto) are disposed longitudinally between the side rails 2 and 3 in a manner wherein the center guide bar 36 is aligned substantially media of the two outer upper guides 35 and 37. One end of the center bar guide 36 is arranged closer to the lubrication unit 28 (Fig. 1) than the complementary ends of the outer guides 35 and 37. Lower guide bars 38 and 39 are supported by the bars 34a (Fig. 3) of the supporting uprights 33 and also adjustable by the bolt members 34b. As will be noted in Figs. 3, 14 to 16, inclusive, the bar guides are arranged to permit passage of the traveling sheet 7 between the upper guides 35, 36 and 37 and the lower guides 38 and 39. One end of the lower guides 38 and 39 are in transverse alignment and are disposed slightly closer to an end 40 of the upper center guide 36 than the upper outer guides 35 and 37 in that the complementary end of the outer guides 35 and 37, although in transverse alignment, are positioned slightly away from the end 40 of the upper guide 36 for a purpose as will be hereinafter set forth.

It will be apparent that the center bar 36 and the upper bars 35 and 37 are secured in any suitable manner (not shown) to the upper bar 34 and are thus supported in substantial longitudinal alignment throughout their disposition in the frame member. However, the outside bars 35 and 37 are disposed longitudinally at a slight angle for a purpose as will be hereinafter set forth. The disposition of the upper guide bars 35, 36 and 37 and the lower guide bars 38 and 39 relative to the traveling web 7 is clearly depicted in Figs. 14, 15 and 16.

Figure 4:
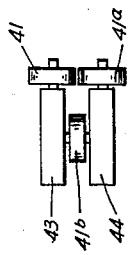
Figure 4 is a detail view of the edge guide rollers.

As will be noted in Figs. 1 and 2, a pair of edge guides 41 and 42 are disposed in proximity of the lubricating station 28 and each guide is journalled in suitable brackets 43 and 44 (Fig. 4) which are supported in any suitable manner by the upright members 29 at positions conterminous with the opposite edges of the traveling web. The opposite edge guide rollers 41 and 42 assist in maintaining correct travel of the web 7 for proper alignment with the guide bars 35 to 39, inclusive. A second set of opposite edge guide rollers 45 and 46 are spaced longitudinally from the guide rollers 41 and 42, having one end disposed slightly adjacent from one end of the outside guide bars 35 and 37 as is clearly shown in Fig. 2. The guide rollers 45 and 46 are similar in structure to the edge guide rollers 41 and 42, but are of greater length and in composite form extending longitudinally through the frame to a point beyond the first set of forming rolls for a purpose as will be hereinafter set forth. As shown in detail in Fig. 4 for one side guide roll, the structure of the guide roller unit comprises an upper roll 41 cooperating with a lower roll 41a mounted on suitable shafts extending laterally from the upper and lower bracket members 43 and 44. The brackets are maintained in vertical spaced relation by a journalled roller 41b disposed therebetween and in perpendicular relationship to the cooperating rolls 41 and 41a. It will be apparent there is sufficient clearance between the rolls 41 and 41a to permit travel of the sheet 7 wherein its edge may contact the outer periphery of the roll 41b and thereby be maintained in proper alignment for travel through the frame 1. The composite edge roll guides 45 and 46 are supported longitudinally in the frame 1 by the plurality of upright members 33a and may be connected thereto in any suitable manner, such as adjustable flange 47 (Fig. 3) for supporting them in proper position relative to the traveling web 7. It will be apparent from Fig. 2 that the edge guides 45 and 46 are disposed at a slight tapered angle to the longitudinal axis of the machine or traveling web for a purpose as will be hereinafter set forth.

The side rails 2 and 3 of the frame member 1 at a point beyond one end of the longitudinal bar guides 36, 38 and 39 are provided with oppositely disposed bearing or pill boxes 49 and 50 in transverse alignment for journalling a transverse rotatable drive shaft 51 in any suitable manner. A pair of upright standards 52 and 53 are secured in any suitable manner to the side frame 3 and in like manner a pair of opposite uprights in transverse alignment are supported in side frame 2. The oppositely disposed uprights adjustably support a pair of oppositely disposed transversely aligned upper bearing boxes 54 in turn journalling an upper shaft 55 in transverse alignment with the lower drive shaft 51. The upper journal boxes are adjustably supported on a threaded upper portion of the members 52 and 53 by suitable threaded members, such as nuts 56 which may be disposed on opposite sides of the flange portion of the box 54. Strengthening bars 57 may be provided for the uprights 52.

Figure 8:
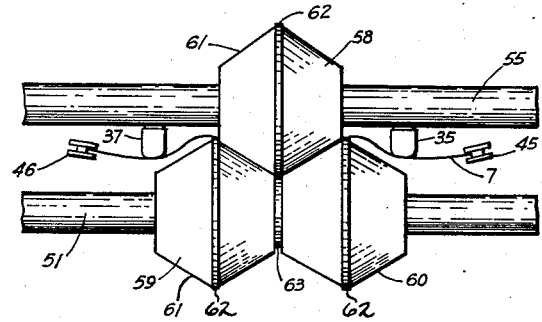
Figure 8 is a detail view in elevation showing the sheet passing through the first set of forming rolls.

The upper rotatable shaft 55 is provided with an upper forming roll 58 (Figs. 1 and 8) and lower shaft 51 is provided with a pair of lower forming rolls 59 and 60. The forming rolls 58, 59 and 60 are provided with angled or tapered outer surfaces 61 having a substantially square shaped (in cross section) flange member 62 formed at the apex thereof. A recessed portion 63 is provided by the clearance between the lower rolls 59 and 60 in which the flange portion 62 of the roll 58 is adapted to be disposed for a purpose as will be hereinafter set forth. It will be apparent that the angled face portion 61 of the forming rolls provide for the pitch or V-shaped (in cross section) angularity of the longitudinally disposed recesses or channels which are to be formed transversely of the traveling sheet 7. Suitable upper guide rollers 64 and lower guide rollers 65 cooperate with the forming rolls for assisting in proper alignment thereof. The upper guide rollers 64 are preferably disposed in alignment with the flange 62 in the upper roll 58 while the lower guide rollers are in alignment with the flange 62 in the lower rolls 59 and 60. The guide rollers are supported on cross bars 75 extending transversely above the forming rolls and supported by the uprights 52 and 53 in any suitable manner. The cross bars 75 may be adjustably supported in the uprights by the threaded members 76. It will be apparent that the guide rollers through adjustment of the pressure bars 75 can maintain sufficient pressure on the upper roll 58 as is required.

A forming roll unit 65a is disposed adjacent the forming rolls 58, 59 and 60 and is provided with similar journal boxes and auxiliary equipment for supporting an upper drive shaft 66 and a lower drive shaft 67 in turn supporting a plurality of upper rolls 68 (preferably three in number, but not limited thereto) and a plurality of lower rolls 69 (preferably four in number, but not limited thereto). It will be apparent that the upper and lower rolls are of a like configuration to that of the rolls 58 and 59 and have tapered surfaces and centrally disposed flange portions for the concentrated forming operation in a manner as will be hereinafter set forth. A third forming unit 70 is disposed adjacent the intermediate set 65a in slightly longitudinal spaced relation thereto and comprises like journal boxes for supporting an upper drive shaft 71 and a lower shaft 72 wherein shaft 71 supports a plurality of upper forming rolls 73 (preferably three in number, but not limited thereto) and lower forming rolls 74 (preferably four in number, but not limited thereto) cooperating with the upper rolls 73 wherein said rolls are constructed in a similar configuration to the rolls of the previous roller forming sets. The sets of rolls 65 and 70 are provided with adjustable pressure bar members 75, along with guide rolls 64 in the same manner as has been previously set forth.

An auxiliary frame unit 80 is supported on the side frames 2 and 3 adjacent the last set of rolls 70 and comprises the cross bars 81 and 82 (Fig. 2) supported by the bars 80 and extending transversely across the web 7. A flange portion 83 is provided on the frame 80 and supports a longitudinally spaced track or rail members 84 and 85 supporting a saw bed 86 (Fig. 1) in turn supporting a motor 87 for actuating a circular saw or cutter 88. The saw member 88 is pivotally supported on a shaft 89 and is moved into and out of position with the sheet 7 manually by a handle 90. Furthermore, the bed 86 is provided with suitable rollers (not shown) affording transverse movement of the bed 86 and the saw 88 transversely across the web 7 so that the circular saw may provide a transverse cut thereacross upon any finished length desired. A suitable scale (not shown) may be utilized for determining the length of cut of the finished sheet.

Figure 11:
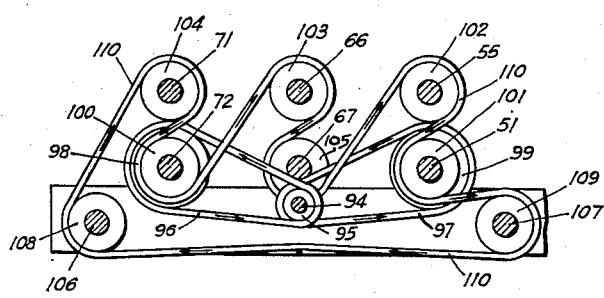
Figure 11 is a side elevational view of the chain drive assembly.

The first set of forming rolls 58 and 59 and the subsequent sets 65 and 70 are driven by a motor 91 (Fig. 2) of suitable horse power connected through a chain and sprocket drive 92 connected with a worm gear speed reducing unit 93 which in turn is connected with drive shaft 94 having a pair of sprocket or pulley members 95 and 95a rigidly mounted thereon and rotatable with the shaft 94. As is clearly shown in Fig. 11, the shaft 94 is disposed below the shaft 66 and in substantial vertical alignment therewith and the pair of pulleys 95 and 95a are connected through suitable chains 96 and 97 with pulleys 98 and 99 mounted on shafts 72 and 51, respectively. As is clearly shown in Figs. 2 and 11, each of the shafts 51 and 72 carry a second pulley of smaller diameter and disposed immediately behind the pulleys 98 and 99 and are numbered 100 and 101, respectively. Upper shafts 55, 66, 71 and lower shaft 67 are each provided with rigidly mounted pulley members 102, 103, 104 and 105. In addition, the side frames 2 and 3 are provided with idler shafts 106 and 107 upon which are rotatably mounted pulley members 108 and 109. The above mentioned pulleys are all substantially the same size and are adapted to receive one continuous chain loop 110 running over pulleys 102 to 109, inclusive, for transmitting power simultaneously to the various shafts associated with the pulleys. It will be apparent that power comes from the motor 91 and gear unit 93 to the shaft 94 which is transmitted through the chains 96, 97 to the large pulleys 98 and 99 to cause rotation of the shafts 72 and 51, respectively. The smaller sprockets 100 and 101 are rotated simultaneously with the larger pulleys 98 and 99 which in turn provide for simultaneous rotation of the auxiliary pulleys mounted on the shafts 55, 66, 71, 67 and including the idler shafts 106, 107. This transmission of power turns the various shafts in unison with a simultaneous rotation of the various forming rolls.

OPERATION

In operation a roll of aluminum alloy of substantially .040 inch in thickness and approximately forty-eight inches in width (but not limited thereto) is roll formed on the shaft 8 and supported in proper elevation at one end of the frame by the jack 10 and the lever 11. The shaft 8 is freely rotatable in the notched end of the lever 11 and a sheet or platen 7 of the aluminum alloy is manually threaded into the frame 1 and into the leveling apparatus 13 and hence to the lubrication station 28 where both sides of the metal sheet are lubricated with a suitable lubricant, such as kerosene or the like. The unrolled sheet is then moved through the edge guide rollers 41, 42 and between the top longitudinal guide bars 35, 36, 37 and the lower guide bars 38 and 39 into edgewise engagement with the oppositely disposed side guide roller units 45, 46 (Fig. 3). The upper and lower longitudinal guide bars are each provided with a felt pad 115 (Fig. 3) on the face of the bar contacting the moving sheet member 7. The soft felt pads facilitate movement of the lubricated sheet between the longitudinal guide bars without any marring of the sheet material, as well as assisting in the bending operation caused by the guide bars.

As the sheet 7 is moved longitudinally through the forming machine, it is initially caused to be bent at the substantial center thereof by the end 40 of the upper bar 36 engaging the top surface thereof to provide a slight concavity to the sheet normally traveling in a horizontal plane. Continued longitudinal movement of the sheet between the upper longitudinal bars 35 and 37 and the lower guide bars 38 and 39 will provide for undulations 116 of the sheet 7 at the point of disposition of the respective guide bars. Substantially simultaneous with the forming of the undulations 116 (Fig. 3) the edge roller guides 45 and 46 assist in maintaining the slight concavity or bend to the traveling sheet. It will be apparent that the angular disposition of the edge guide roller units 45 and 46 as well as that of the upper outside longitudinal guides 35 and 37 will compensate for any decrease in the width of the sheet 7 during the forming undulations 116 therein. Continued movement of the sheet will progressively form the undulations until contact with the first set of forming rolls 58 and 59 which are being rotated simultaneously from the power supply 91 through the chain drive previously described.

Figure 5:
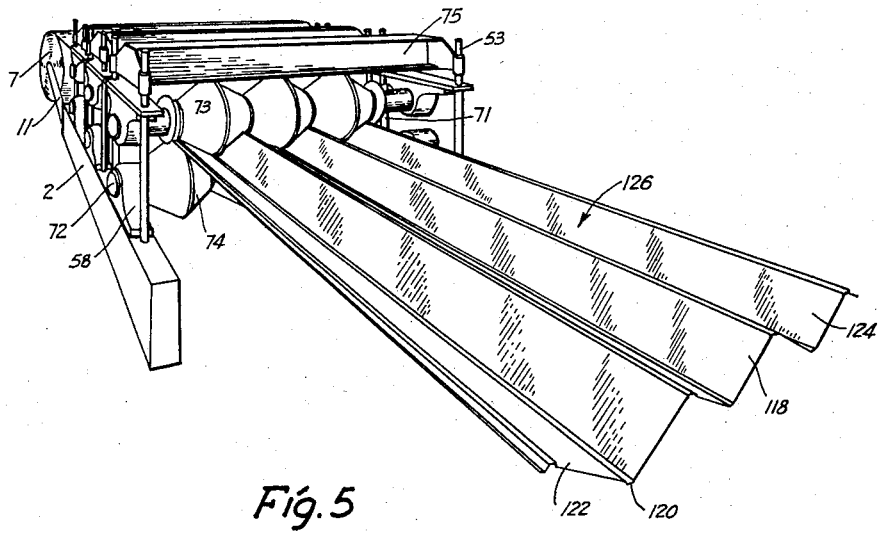
Figure 5 is a perspective view taken from one end with certain parts omitted for clarity and showing the finished panel coming from the forming machine.

As the concavely bent and transversely undulated sheet of metal is moved into the first set of forming rolls 58 and 59, the center or middle angular recessed portion 118 (Fig. 5) is formed by the sheet 7 passing between the tapered surfaces 61 of the rolls 58, 59 and 60. It will be apparent that the cooperating flange 62 and the recesses 63 of the first set of rolls provide for the up-set bend or flat topped flange portion 120. The progressive forming of the undulations prior to the concentrated application of forming pressure by the first set of forming rolls precludes the necessity of concentrating the pressure through the entire forming operation. The concentrated pressure of the upper and lower forming rolls is applied in the immediate area of the up-set recesses or flat top rib section 120 thereby permitting the use of considerably lighter rolling equipment. It will be apparent that the upper roll 58 and cooperating lower rolls 59 and 60 in meshing together against the sheet 7 passing therebetween form the proper pitch for the center angled recess 118.

Figure 7:
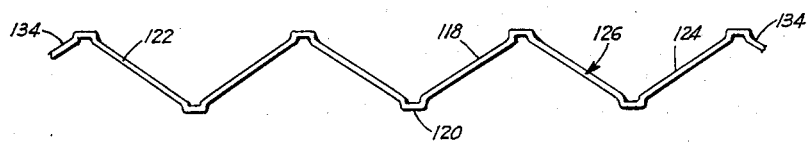
Figure 7 is a similar view on a slightly smaller scale showing a single panel.

Subsequently the sheet 7 is fed from the first set of rolls into the second set of forming rolls 65 comprising three upper and four lower rolls (Fig. 9) to form the two outer recesses 122 and 124, respectively, with the flat top rib members 120 similar to that formed in the center recess 118. The initial forming of the center pitch recess 118 with a subsequent forming of the two outer recesses 122 and 124 allows for shrinking in the forming of the construction panel of a specified depth which in the present instance is four inches (but not limited thereto) without any substantial risk of metal rupture. The panel is then fed by rotation of the forming rolls into the third set of forming rolls 70 which are similar and identical in number to the second set of forming rolls 65, but are utilized to correct any irregularities in the flat top rib member 120, and any of the angled recesses. The forming of the flat sheet 7 in progressive steps of initially bent and a subsequently undulated sheet moving through the first set of forming rolls provides for a drawing in and downward pressure of the metal panel only in the concentrated application of forming the center rib or recess 118. The continuous feeding into the subsequent forming rolls is such that the two outer undulations 116 are drawn in and downwardly by the concentrated application of the pressure rolls to form the outer ribs or recesses 122 and 124. The flanges 62 cooperating with the grooves 63 in all of the forming rolls provide for the flat top rib member 120 both at the top and bottom of the over-all panel 126, or at the apex of a respective channel or recess portion. As the formed construction panel 126 (Figs. 5 and 7) is moved from the third set of rolls 70, it will be severed by the rotary cutter 88 movable transversely across the panel 126 on the saw bed 86 movable on the tracks 84 and 85. The saw 88 is moved into engagement with the panel by the handle 90. A movable or fixed scale (not shown) may be provided along a side of the frame 80 to determine the length of cut desired.

Figure 6:
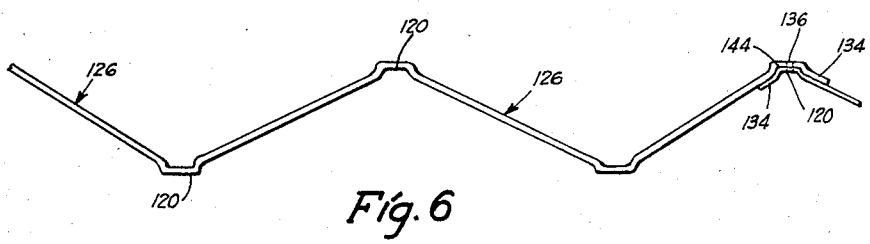
Figure 6 is a detail view in end elevation of the finished panel showing an overlapping connection with an adjoining panel.
Figure 9:
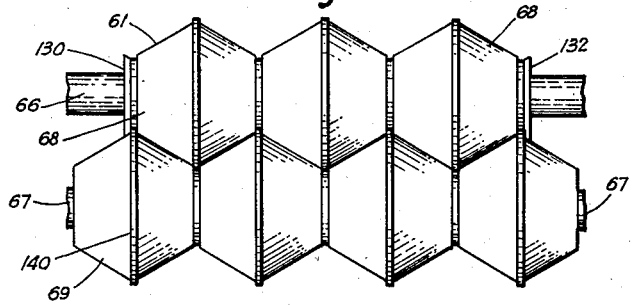
Figure 9 is a similar view showing the second set of forming rolls.
Figure 10:
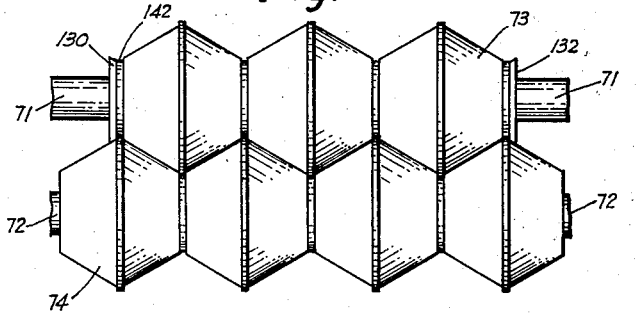
Figure 10 is a view showing the third set of forming rolls.

From Figs. 9 and 10 it will be apparent that the upper rolls 68 and 73 are provided with outer flange members 130 and 132 for forming the outer ribs or recesses 122 and 124 with a slight extension or weather proof flange 134 at opposite sides of the finished panel 126. In Fig. 6 is shown an application of a weather proof joint 136 provided by the overlapping panels 126. In the second and third sets of forming rolls 65 and 70, the up-set forming flange on the lower set of rolls and shown at 140 may be slightly wider and cooperates with a slightly wider recess 142 to provide an up-set portion of slightly greater dimension such as shown at 144 (Fig. 6) to permit an adjoining up-set 120 to fit therein, thus providing the weather proof joint 136.

The flat top rib members or up-set flanges 120 cooperating with the angled recesses provide for a construction panel of greater strength and rigidity that will retain its shape without any appreciable flexing or bending even in substantial lengths thereof. This provides for an increased ratio of strength as to the over-all weight and is of particular advantage in all types of conventional construction utilizing walls and roofs. The greater strength and rigidity eliminates considerable purlins and other bracing members necessary in construction of this type with a comparable economy in labor.

From the foregoing, it will be apparent that the present invention contemplates a method and apparatus of forming a structural aluminum panel of exceptional strength and rigidity wherein a flat aluminum sheet is caused to travel in a horizontal plane and during said travel is initially curved or bent with a subsequent forming of irregular curves or undulations in the initially bent sheet, after which concentrated pressure through forming rolls provides for a plurality of angled recesses which are V-shaped in cross-section and extend longitudinally of the panel. Furthermore, said recesses are formed with up-set or rib like flange members at their top and bottom to provide an increased ratio of strength relative to weight. The finished panel may be severed in any desirable lengths as it is continuously fed from the machine. Under practical circumstances it has been found that the panel may be conveniently transported in up to forty foot lengths or more, and with the forty inch width of rigid strength permits easy handling of such lengths. The finished panel is suited for variable types of construction, either wall or roof, that has been set forth in applicant's co-pending application Serial No. 429,202, filed May 12, 1954, entitled "Structural Panel" and is for the panel per se.

Furthermore, it will be apparent that the present invention is not limited to the forming of aluminum panels, but may be utilized with any suitable metal material, such as steel or the like, substantially in the same manner as has been set forth.

Changes may be made in the combination and arrangement of parts as heretofore set forth in the specification and shown in the drawings, it being understood that any modification in the precise embodiment of the invention may be made within the scope of the following claims without departing from the spirit of the invention.

I claim:

1. In an apparatus for forming a construction panel having a plurality of transverse angled recesses therein comprising in combination a frame for supporting a roll of sheet material at one end thereof for moving the sheet material through the frame in a horizontal plane, means for leveling the traveling sheet material, lubricating means for applying lubricant to opposite faces of the traveling sheet, guide means at opposite sides of the sheet to maintain alignment of the sheet travel through the frame, a plurality of padded longitudinal guide bars disposed above and below the traveling sheet and in contact therewith, one of said guide bars engaging the center of the sheet ahead of the other of said bars to cause an initial bending of the sheet in a slight concave configuration, said other longitudinal guide bars subsequently engaging the traveling sheet to provide a plurality of transverse undulations therein, a portion of said longitudinal guide bars disposed in angled relation to the travel of the sheet in order to compensate for the undulations.

2. In an apparatus for forming a construction panel having a plurality of transverse angled recesses therein comprising in combination a frame for supporting a roll of sheet material at one end thereof for moving the sheet material through the frame in a horizontal plane, means for leveling the traveling sheet material, lubricating means for applying lubricant to opposite faces of the traveling sheet, guide means at opposite sides of the sheet to maintain alignment of the sheet travel through the frame, a plurality of padded longitudinal guide bars disposed above and below the traveling sheet and in contact therewith, one of said guide bars engaging the center of the sheet ahead of the other of said bars to cause an initial bending of the sheet in a slight concave configuration, said other longitudinal guide bars subsequently engaging the traveling sheet to provide a plurality of transverse undulations therein, a portion of said longitudinal guide bars disposed in angled relation to the travel of the sheet in order to compensate for the undulations, a set of forming rolls comprising an upper roll cooperating with a pair of lower rolls for receiving the undulated traveling sheet therebetween, said rolls having cooperating tapered outer faces applying concentrated pressure to one of the undulated portions of the sheet to form an angled channel therein, and means on the forming rolls providing a rib-like shape to the apex portion of the angled channel.

3. In an apparatus for forming a construction panel having a plurality of transverse angled recesses therein comprising in combination a frame for supporting a roll of sheet material at one end thereof for moving the sheet material through the frame in a horizontal plane, means for leveling the travel sheet material, lubricating means for applying lubricant to opposite faces of the traveling sheet, guide means at opposite sides of the sheet to maintain alignment of the sheet travel through the frame, a plurality of padded longitudinal guide bars disposed above and below the traveling sheet and in contact therewith, one of said guide bars engaging the center of the sheet ahead of the other of said bars to cause an initial bending of the sheet in a slight concave configuration, said other longitudinal guide bars subsequently engaging the traveling sheet to provide a plurality of transverse undulations therein, a portion of said longitudinal guide bars disposed in angled relation to the travel of the sheet in order to compensate for the undulations, a set of forming rolls comprising an upper roll cooperating with a pair of lower rolls for receiving the undulated traveling sheet therebetween, said rolls having cooperating tapered outer faces applying concentrated pressure to one of the undulated portions of the sheet to form an angled channel therein, and means on the forming rolls providing a rib-like shape to the apex portion of the angled channel, a plurality of subsequent sets of upper and lower forming rolls for receiving the traveling sheet therebetween from the first set of rollers, said subsequent forming rolls forming additional angled channels therein, each of said subsequent forming rolls having means providing a rib-like shape to the apex portion of the additional channels.

References Cited in the file of this patent

UNITED STATES PATENTS

| | | |
|---|---|---|
| 815,710 | Johnson | Mar. 20, 1906 |
| 1,770,963 | Yoder | July 22, 1930 |
| 1,947,015 | Littel | Feb. 13, 1934 |
| 2,494,431 | Eckstein | Jan. 10, 1950 |
| 2,649,888 | Fay | Aug. 25, 1953 |

FOREIGN PATENTS

| | | |
|---|---|---|
| 664 | Great Britain | Jan. 10, 1903 |
| 19,056 | Great Britain | Aug. 19, 1915 |